(12) United States Patent
Hiraiwa et al.

(10) Patent No.: US 10,632,846 B2
(45) Date of Patent: Apr. 28, 2020

(54) HIGH-VOLTAGE DEVICE

(71) Applicants: MITSUBISHI JIDOSHA ENGINEERING KABUSHIKI KAISHA, Okazaki-shi, Aichi (JP); MITSUBISHI JIDOSHA KOGYO KABUSHIKI KAISHA, Tokyo (JP)

(72) Inventors: Yoshio Hiraiwa, Tokyo (JP); Akihisa Kato, Tokyo (JP); Akihiro Kagitani, Tokyo (JP); Kohei Higashitani, Tokyo (JP); Naoki Taniguchi, Tokyo (JP)

(73) Assignees: MITSUBISHI JIDOSHA KOGYO KABUSHIKI KAISHA, Tokyo (JP); MITSUBISHI JIDOSHA ENGINEERING KABUSHIKI KAISHA, Okazaki-Shi (JP)

( * ) Notice: Subject to any disclaimer, the term of this patent is extended or adjusted under 35 U.S.C. 154(b) by 0 days.

(21) Appl. No.: 15/920,684

(22) Filed: Mar. 14, 2018

(65) Prior Publication Data

US 2018/0281595 A1 Oct. 4, 2018

(30) Foreign Application Priority Data

Mar. 31, 2017 (JP) ................................. 2017-069771

(51) Int. Cl.
*B60K 1/00* (2006.01)
*H02K 5/04* (2006.01)
(Continued)

(52) U.S. Cl.
CPC .............. *B60L 3/0007* (2013.01); *B60K 1/00* (2013.01); *B62D 25/2027* (2013.01); *H02K 5/04* (2013.01);
(Continued)

(58) Field of Classification Search
CPC ..... B62D 25/2027; B60K 1/00; B60L 3/0007; B60Y 2400/61; B60Y 2410/10;
(Continued)

(56) References Cited

U.S. PATENT DOCUMENTS 4,835,428 A * 5/1989 Komurasaki ........... F02B 63/04
310/68 D
7,602,095 B2 * 10/2009 Kusase ................... H02K 19/22
310/114

(Continued)

FOREIGN PATENT DOCUMENTS

DE 69914973 T2 12/2004
DE 102016209105 A1 12/2016
(Continued)

OTHER PUBLICATIONS

The Extended European Search Report dated Oct. 8, 2018, issued in the corresponding European Patent Application No. 18163068.2.

*Primary Examiner* — James A Shriver, II
*Assistant Examiner* — Steve Clemmons
(74) *Attorney, Agent, or Firm* — Birch, Stewart, Kolasch & Birch, LLP

(57) ABSTRACT

To reduce the number of components, size and weight while preventing breakage of the casing, a high-voltage device provided adjacent to a vehicle component constituting a vehicle includes: a casing housing a high-voltage portion; and a plurality of bolts fastening the casing to an attachment portion to which the casing is attached. The high-voltage device has a first end face at which the casing is in contact with the attachment portion and a second end face opposite to the first end face, and the plurality of bolts are composed of long bolts extending from the second end face to the first (Continued)

end face. The long bolts are each attached to the casing at a position between the vehicle component and the high-voltage portion.

12 Claims, 3 Drawing Sheets

(51) Int. Cl.
    *B60L 3/00*         (2019.01)
    *B62D 25/20*     (2006.01)
    *B60K 1/04*        (2019.01)

(52) U.S. Cl.
    CPC ... *B60K 2001/0438* (2013.01); *B60Y 2306/01* (2013.01); *B60Y 2400/61* (2013.01); *B60Y 2410/10* (2013.01); *Y02T 10/7258* (2013.01)

(58) Field of Classification Search
    CPC ...... B60Y 2306/01; H02K 5/04; H02K 11/30; H02K 5/22
    See application file for complete search history.

(56) References Cited

U.S. PATENT DOCUMENTS

| | | | | |
|---|---|---|---|---|
| 8,640,801 B2 * | 2/2014 | Hennings | ............. | B60K 7/0007 |
| | | | | 180/65.6 |
| 9,240,708 B2 * | 1/2016 | Sakaguchi | ............... | H02K 5/04 |
| 9,270,145 B2 * | 2/2016 | Asao | ...................... | H02K 1/185 |
| 9,393,988 B2 * | 7/2016 | Murakami | ............... | B62D 3/00 |
| 9,525,317 B2 * | 12/2016 | Ohashi | ................... | H02K 5/225 |
| 9,724,990 B2 * | 8/2017 | Hoermandinger | ....... | B60K 5/04 |
| 9,853,516 B2 * | 12/2017 | Taniguchi | ................ | H02K 5/15 |
| 9,948,154 B2 * | 4/2018 | Bohm | ...................... | H02K 3/28 |
| 9,949,386 B2 * | 4/2018 | Matsuyama | ........... | H02K 5/225 |
| 10,050,493 B2 * | 8/2018 | Kabune | ................. | H02K 11/33 |
| 10,183,692 B2 * | 1/2019 | Yamamoto | ........... | B62D 5/0406 |
| 2006/0273671 A1 * | 12/2006 | Oohashi | ................. | H02K 5/225 |
| | | | | 310/68 D |
| 2012/0161590 A1 | 6/2012 | Yamasaki et al. | | |
| 2014/0091683 A1 * | 4/2014 | Ito | ........................ | B62D 5/0406 |
| | | | | 310/68 R |
| 2014/0097641 A1 | 4/2014 | Hayano | | |
| 2014/0167559 A1 * | 6/2014 | Eike | ........................ | H02K 15/00 |
| | | | | 310/216.131 |
| 2016/0329781 A1 * | 11/2016 | Onishi | ..................... | H02K 5/04 |
| 2017/0349206 A1 * | 12/2017 | Asao | ........................ | H05K 7/20 |
| 2017/0373549 A1 * | 12/2017 | Takizawa | ................ | H02K 5/04 |
| 2018/0159400 A1 * | 6/2018 | Michna | .................. | B60K 1/00 |
| 2018/0281595 A1 * | 10/2018 | Hiraiwa | ............. | B62D 25/2027 |
| 2018/0294689 A1 * | 10/2018 | Minami | ................. | H02K 1/185 |

FOREIGN PATENT DOCUMENTS

| | | |
|---|---|---|
| JP | 2012-152091 A | 8/2012 |
| JP | 2014-76685 A | 5/2014 |
| WO | WO-2017076578 A1 * | 5/2017 ............... H02K 9/04 |

\* cited by examiner

HIGH-VOLTAGE DEVICE

TECHNICAL FIELD

The present disclosure relates to a high-voltage device.

BACKGROUND

Patent Document 1 (JP2012-152091A) provides a motor unit mounted to a vehicle such as an electric vehicle or a hybrid vehicle using a motor as a driving source.

The motor unit includes a vehicle driving motor and a high-voltage device attached to the vehicle driving motor.

The high-voltage device includes a high-voltage control for controlling the vehicle driving motor, a control casing housing the high-voltage control, and a closing plate for closing the control casing.

Such a motor unit is disposed, for example, under a floor panel of a vehicle. There is thus concern that the motor unit collides with a vehicle component such as a crossmember upon vehicle collision, resulting in breakage of the control casing and the closing plate.

Thus, it is considerable to protect the motor unit by providing a protector made of a metal plate outside the motor unit, as disclosed in Patent Document 2 (JP2014-76685A).

SUMMARY

Unfortunately, when the protector is provided as in the prior art, the motor unit increases the number of components, size, and weight.

The present invention was made in view of the above circumstances. An object of at least one embodiment of the present invention is to provide a high-voltage device that advantageously reduces the number of components, size and weight while preventing breakage of the casing.

To solve the above problem, a high-voltage device according to at least one embodiment of the present invention, provided adjacent to a vehicle component constituting a vehicle, comprises: a casing housing a high-voltage portion, and a plurality of bolts fastening the casing to an attachment portion to which the casing is attached, the high-voltage device having a first end face at which the casing is in contact with the attachment portion and a second end face opposite to the first end face, the plurality of bolts being long bolts extending from the second end face to the first end face, the long bolts each being attached to the casing at a position between the vehicle component and the high-voltage portion.

With this configuration, a portion of the casing located more inwardly than the long bolts is protected by the long bolts. Thus, it is advantageous in preventing breakage caused from outside to inside of the casing during vehicle collision.

Consequently, it is advantageous in reducing the number of components, size and weight of the vehicle structure.

In some embodiments, the long bolts are disposed, with a spatial interval, at a side of the casing which faces the vehicle component, and the long bolts respectively extend in an identical direction.

With this configuration, when one long bolt is pressed by the vehicle component upon vehicle collision and the casing is thereby rotated, the inwardly located portion of the casing is protected by the other long bolts. Thus, it is more advantageous in preventing breakage caused from outside to inside of the casing during vehicle collision.

In some embodiments, the high-voltage device is provided under a floor panel of the vehicle, the vehicle component comprises the floor panel and a frame member bonded to a lower face of the floor panel and extending along the floor panel, and the long bolts extend in a longitudinal direction of the frame member.

With this configuration, the inwardly located portion of the casing is protected by the long bolts from the floor panel or the frame member during vehicle collision. Thus, it is more advantageous in preventing breakage caused from outside to inside of the casing during vehicle collision.

In some embodiments, the long bolts are disposed at an upper end on a side of the casing which faces the frame member; at a position facing a lower end of the frame member on the side of the casing which faces the frame member; and at an end portion opposite to the frame member on a side of the casing which faces the floor panel.

This configuration is more advantageous in enhancing the effect of preventing breakage caused from outside to inside of the casing during vehicle collision.

In some embodiments, insert boss portions for receiving the bolts are provided, at portions of the casing into which the long bolts are inserted, so as to project toward the vehicle component.

With this configuration, the long bolts are strongly supported by the casing via the insert boss portions. Thus, it is more advantageous in preventing breakage caused from outside to inside of the casing, by the long bolts, during vehicle collision.

In some embodiments, the high-voltage portion is a high-voltage control, attached to a vehicle driving motor, for controlling the vehicle driving motor.

This configuration is advantageous in protecting the high-voltage control for controlling the vehicle driving motor by the long bolts during vehicle collision.

In some embodiments, the casing comprises a first casing to which the high-voltage control is attached and a second casing which covers the high-voltage control, and the long bolts penetrate the first casing and the second casing so that the long bolts fasten the first casing to the second casing and fasten the second casing to the vehicle driving motor.

This configuration is more advantageous in protecting the high-voltage control for controlling the vehicle driving motor by the long bolts during vehicle collision.

DETAILED DESCRIPTION

Figure 1:
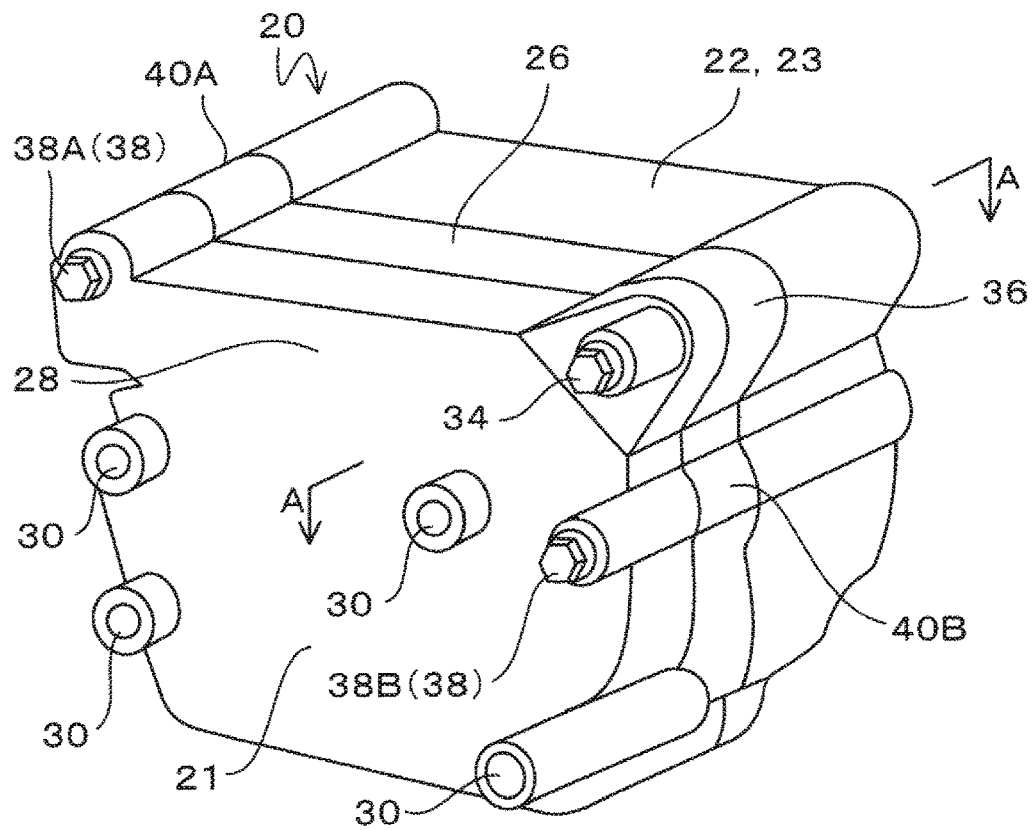
FIG. 1 is a perspective view illustrating a configuration of a motor unit including a high-voltage device according to an embodiment.

Embodiments of the present invention will now be described with reference to the drawings.

In the drawings, the reference FR indicates front in a front-back direction of a vehicle, whereas the reference UP indicates upper side of a vehicle.

The present embodiment describes a case where a high-voltage device is attached to a vehicle driving motor for driving rear wheels of a vehicle, and a motor unit is composed of the high-voltage device and the vehicle driving motor.

First, the explanation will be given about the structure of vehicle rear at which the motor unit is disposed.

Figure 3:
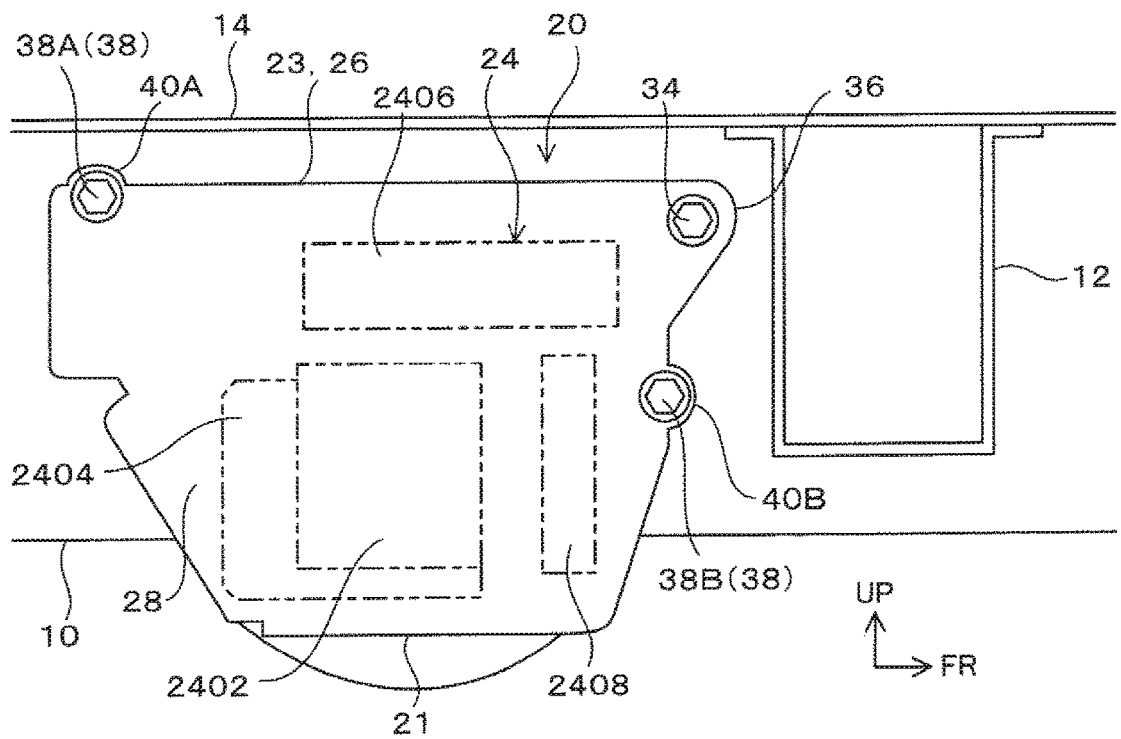
FIG. 3 is a diagram of a high-voltage device in an attachment state, viewing from a vehicle width direction, according to an embodiment.

As shown in FIG. 3, the vehicle rear is provided with a pair of rear side members (vehicle frame member) 10 extending in the vehicle front-back direction at both sides in the vehicle width direction, a rear floor crossmember (vehicle frame member) 12 extending in the vehicle width direction and connecting the pair of rear side members 10, a rear floor panel 14 disposed above the rear side members 10 and the rear floor crossmember 12, and rear wheels (not shown).

The motor unit 20 is disposed behind the rear floor crossmember 12 and under the rear floor panel 14.

Figure 2:
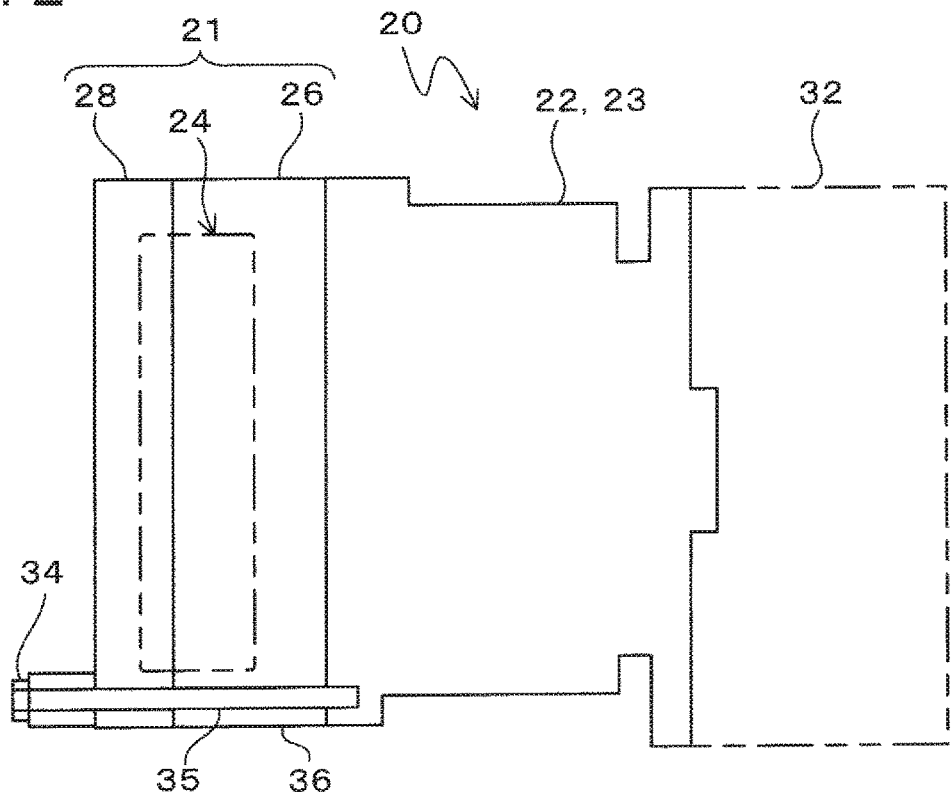
FIG. 2 is a cross-sectional view taken along line A-A in FIG. 1.

As shown in FIG. 1 and FIG. 2, the motor unit 20 includes a vehicle driving motor 22 and a high-voltage device 21. The high-voltage device 21 includes a high-voltage control 24, a control casing 26, and a closing plate 28.

The vehicle driving motor 22 is configured to drive the rear wheels and includes a motor casing 23 made of aluminum alloy, as well as a stator and a rotor (not shown) provided inside the motor casing 23.

The high-voltage control 24, which is configured to control the vehicle driving motor 22, includes, as shown in FIG. 3, a substrate 2404 on which a semiconductor device 2402 for controlling electric power is mounted, a condenser 2406 for controlling electric power, and a current sensor 2408, and serves as a high voltage portion which controls high-voltage electric power to be supplied to the vehicle driving motor 22.

The control casing 26 is configured to house the high-voltage control 24 and made of aluminum alloy.

The closing plate 28 is configured to close the control casing 26 and made of aluminum alloy.

In the present embodiment, the control casing 26 and the closing plate 28 constitute the casing in scope of the claims.

The high-voltage control 24 is fixed to the closing plate 28.

At the motor casing 23 side, the control casing 26 has a three-phase bus bar connecting the high-voltage control 24 to a winding of the stator provided inside the motor casing 23, a hole into which a cable is inserted from a sensor provided inside the motor casing 23 for measuring the rotational speed or the temperature of the rotor, a rotor bearing, etc.

The high-voltage control 24 is fixed to the motor casing 23 by fixing the control casing 26 to the motor casing 23 and then fastening the closing plate 28 to the control casing 26.

The closing plate 28, the control casing 26, and the motor casing 23 are arranged in the vehicle width direction and fastened with a plurality of bolts (long bolts) 34, 38 which are located at outer peripheral portions of the closing plate 28, the control casing 26, and the motor casing 23, i.e., at outer peripheral portions of the motor unit 20.

In the present embodiment, the plurality of bolts 34, 38 fasten the closing plate 28 to the control casing 26 and fix the closing plate 28 and the control casing 26 to the motor casing 23.

In the present embodiment, the motor casing 23 corresponds to the attachment portion, to which the casing is attached, in scope of the claims.

Additionally, the bolts 34, 38 are each attached to the closing plate 28 and the control casing 26 at a position between the high-voltage portion and the vehicle component which includes the rear floor crossmember (vehicle frame member) 12 and the rear floor panel (floor panel) 14.

The bolts 34, 38 are made of a stronger material than at least the control casing 26 and the closing plate 28, for example a steel material.

As shown in FIG. 1, the closing plate 28 is provided with a plurality of mount attachment portions 30. With mounts (not shown) attached to the mount attachment portions 30, the motor unit 20 is connected to the vehicle frame member such as the rear side member 10 via a rear suspension crossmember (not shown).

In this context, the plurality of bolts 34, 38 may be used to attach the mounts. That is, the mount attachment portions 30 may be insert boss portions 36, 40 into which the plurality of bolts 34, 38 are inserted. This eliminates additional bolts for attaching the mounts, thus reducing the number of components and man-hours.

Additionally, as shown in FIG. 2, a reduction mechanism 32 for transmitting motor power with reduced rotational speed to the rear wheels is connected to an end portion of the motor casing 23 opposite to the closing plate 28.

One of the bolts fastening the closing plate 28 to the control casing 26 and fixing the closing plate 28 and the control casing 26 to the motor casing 23, a first bolt 34, is disposed at the closest position to the rear floor crossmember 12 on a side of the closing plate 28 and the control casing 26 which faces the rear floor crossmember 12. In other words, the first bolt 34 is disposed at an upper end of the side of the closing plate 28 and the control casing 26 which faces the rear floor crossmember 12.

Figure 4:
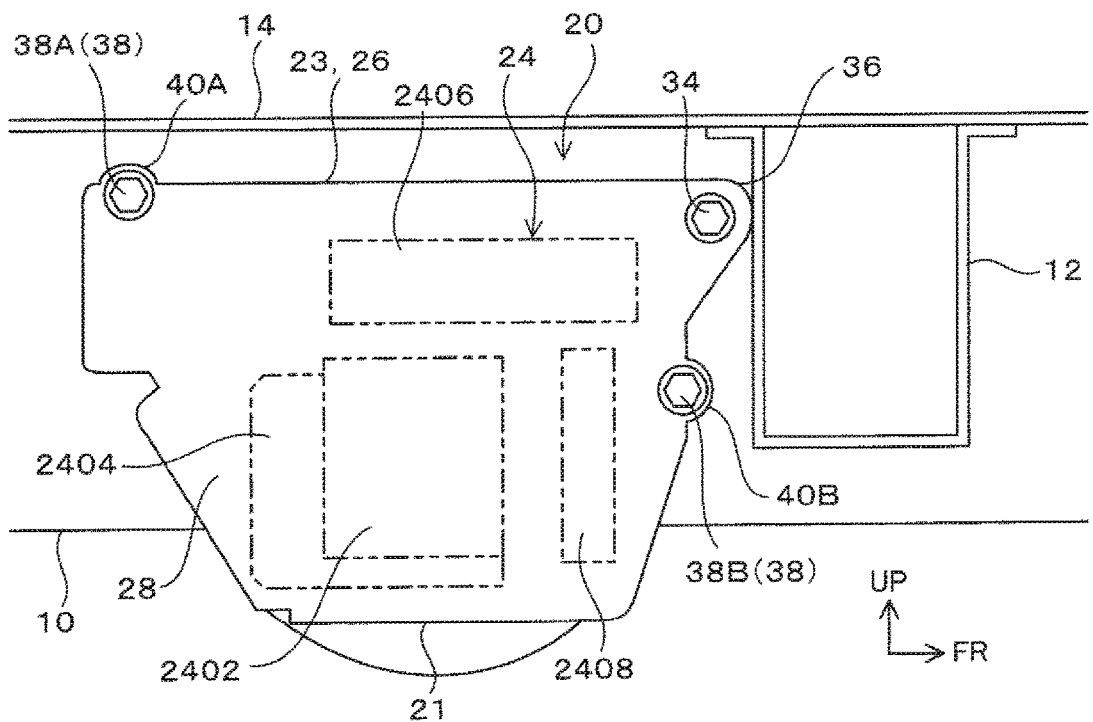
FIG. 4 is a diagram illustrating a state where an insert boss portion of a first bolt collides with a rear crossmember by vehicle collision.

That is, as shown in FIG. 4, one of the bolts, namely, the first bolt 34 is located at a position where the motor unit 20 firstly collides with the rear floor crossmember 12 of the vehicle component upon vehicle collision.

A shaft portion 35 of the first bolt 34 extends in the vehicle width direction parallel to a direction in which the rear floor crossmember 12 extends. Moreover, the shaft portion 35 penetrates the control casing 26 and the closing plate 28 and extends over the entire length of the control casing 26 and the closing plate 28 in the vehicle width direction.

In other words, the control casing 26 is in contact with the motor casing 23 at a first end face, and the first bolt 34 extends from a second end face opposite to the first end face, to the first end face.

In more detail, as shown in FIGS. 1, 3, and 4, an insert boss portion 36 for receiving the first bolt 34 is provided so as to project toward the rear floor crossmember 12 at a portion where the closing plate 28, the control casing 26, and the motor casing 23 collide with the rear floor crossmember 12 upon vehicle collision.

As shown in FIG. 2, the insert boss portion 36 extends across the closing plate 28, the control casing 26, and the motor casing 23 over the entire length of the shaft portion 35 of the first bolt 34, and extends over the entire length of the control casing 26 and the closing plate 28 in the vehicle width direction. Thus, the shaft portion 35 of the first bolt 34 is strongly supported.

Additionally, a second bolt 38 is located in the motor unit 20 at a different position from the first bolt 34.

A shaft portion 35 of the second bolt 38 extends in a direction intersecting with a direction in which the motor unit 20 collides with the rear floor crossmember 12 or the rear floor panel 14 of the vehicle component, in other words, extends in the vehicle width direction, and extends over the entire length of the control casing 26 and the closing plate 28 in the vehicle width direction. Thus, the shaft portion 35 of the second bolt 38 is strongly supported.

In other words, the second bolt 38 extends from the second end face, opposite to the first end face at which the control casing 26 is in contact with the motor casing 23, to the first end face.

In more detail, two second bolts 38 are provided in the present embodiment.

Figure 5:
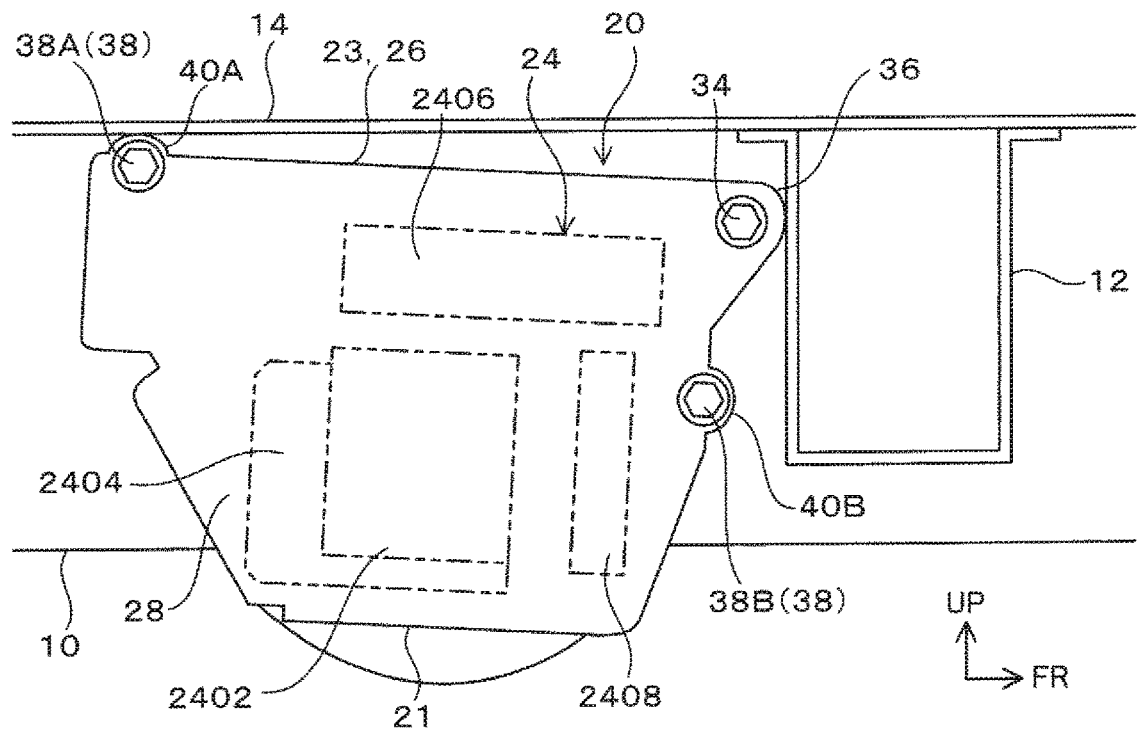
FIG. 5 is a diagram illustrating a state where an insert boss portion of a second bolt collides with a rear floor panel by vehicle collision.

One of the two second bolts 38, a second bolt 38A, is provided at an end portion opposite to the rear floor crossmember 12 on a side of the motor unit 20 which faces the rear floor panel 14, as shown in FIGS. 1, 3, and 5.

That is, an insert boss portion 40A for receiving the second bolt 38A is provided so as to project toward the rear floor panel 14 at a position where, after the motor unit 20 collides with the rear floor crossmember 12 upon vehicle collision, the motor unit 20 firstly collides with the rear floor panel 14 by further being pressed and thereby rotating a rear end portion of the motor unit 20 around the first bolt 34 upwardly.

The insert boss portion 40A extends across the closing plate 28, the control casing 26, and the motor casing 23 over the entire length of the shaft portion 35 of the second bolt 38A, in other words, extends in the vehicle width direction, and extends over the entire length of the control casing 26 and the closing plate 28 in the vehicle width direction. Thus, the shaft portion 35 of the second bolt 38A is strongly supported.

Figure 6:
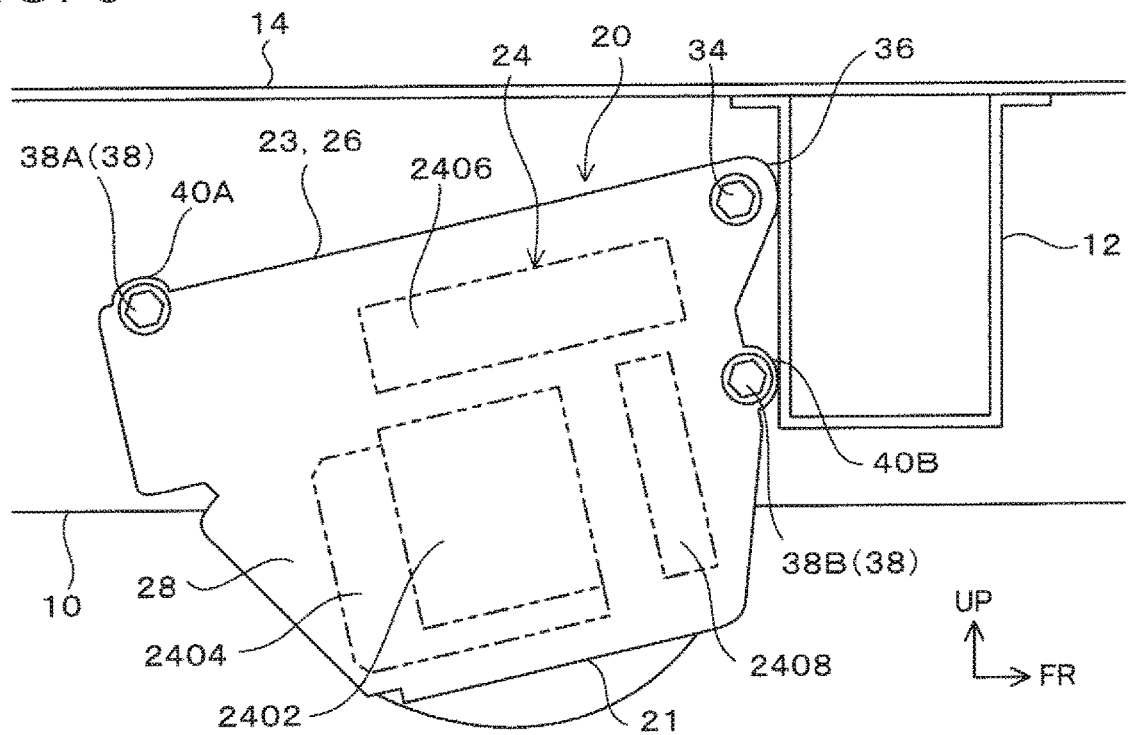
FIG. 6 is a diagram illustrating a state where an insert boss portion of a second bolt collides with a rear crossmember by vehicle collision.

The other of the two second bolts 38, a second bolt 38B, is provided at a portion lower than the first bolt 34 in the vehicle direction and upper than the lower end of the rear floor crossmember 12 in the vehicle direction, on the side of the motor unit 20 which faces the rear floor crossmember 12, as shown in FIGS. 1, 3, and 6. In other words, the second bolt 38B is disposed at a position facing the lower end of the rear floor crossmember 12 on the side of the control casing 26 and the closing plate 28 which faces the rear floor crossmember 12.

That is, an insert boss portion 40B for receiving the second bolt 38B is provided so as to project toward the rear floor crossmember 12 at a position where, after the motor unit 20 collides with the rear floor crossmember 12 upon vehicle collision, the motor unit 20 collides with the rear floor crossmember 12 by further being pressed and thereby rotating a lower end portion of the motor unit 20 around the first bolt 34 forwardly.

The insert boss portion 40B extends across the closing plate 28, the control casing 26, and the motor casing 23 over the entire length of the shaft portion 35 of the second bolt 38B, in other words, extends in the vehicle width direction, and extends over the entire length of the control casing 26 and the closing plate 28 in the vehicle width direction. Thus, the shaft portion 35 of the second bolt 38B is strongly supported.

As described above, the first bolt 34 and the second bolts 38A, 38B are disposed at a side of the closing plate 28 and the control casing 26 which faces the vehicle component (rear floor crossmember 12 and rear floor member 14) with a spatial interval. The bolts 34, 38A, 38B each extend in an identical direction.

Next, effects are explained.

As shown in FIG. 3 and FIG. 4, when the motor unit 20 is pressed upon vehicle collision, the motor unit 20 approaches the rear floor crossmember 12, and the insert boss portion 36 of the first bolt 34 collides with the rear floor crossmember 12.

In this regard, the first bolt 34 is located at the closest position to the rear floor crossmember 12 on the side of the motor unit 20 which faces the rear floor crossmember 12, and the shaft portion 35 of the first bolt 34 extends in the direction intersecting with the direction in which the motor unit collides with the rear floor crossmember 12. Thus, a portion of the control casing 26 and a portion of the closing plate 28 located more inwardly in the motor unit 20 than the shaft portion 35 of the first bolt 34 are protected from the collision with the rear floor crossmember 12 by the shaft portion 35 of the first bolt 34. It is thus advantageous in preventing breakage caused from outside to inside of the control casing 26 and the closing plate 28.

Additionally, since the shaft portion 35 of the first bolt 34 extends over the entire length of the control casing 26 and the closing plate 28 in the vehicle width direction, it is more advantageous in preventing breakage caused from outside to inside of the control casing 26 and the closing plate 28.

Additionally, since the insert boss portion 36 of the first bolt 34 projects toward the rear floor crossmember 12 so that the first bolt 34 is strongly supported by the control casing 26 and the closing plate 28 via the insert boss portion 36, it is advantageous in preventing breakage caused from outside to inside of the control casing 26 and the closing plate 28 by the shaft portion 35 of the first bolt 34.

Additionally, since the insert boss portion 36 extends over the entire length of the control casing 26 and the closing plate 28 in the vehicle width direction, it is advantageous in more strongly supporting the shaft portion 35 of the first bolt 34, and it is more advantageous in preventing breakage caused from outside to inside of the control casing 26 and the closing plate 28.

As shown in FIG. 4 and FIG. 5, when the insert boss portion 36 of the first bolt 34 collides with the rear floor crossmember 12 upon vehicle collision, and then a rear portion of the motor casing 23 is biased upwardly due to a load applied to the motor casing 23, the insert boss portion 40A of the second bolt 38A collides with the rear floor panel 14.

In this regard, the second bolt 38A is located at an outer peripheral portion of the motor unit 20, and the shaft portion 35 of the second bolt 38A extends in the direction intersecting with the direction in which the motor unit collides with the rear floor panel 14. Thus, a portion of the control casing 26 and a portion of the closing plate 28 located more inwardly in the motor unit 20 than the shaft portion 35 of the second bolt 38A are protected from the collision with the rear floor panel 14 by the shaft portion 35 of the second bolt 38A. It is thus advantageous in preventing breakage caused from outside to inside of the control casing 26 and the closing plate 28.

Additionally, since the shaft portion 35 of the second bolt 38A extends over the entire length of the control casing 26 and the closing plate 28 in the vehicle width direction, it is more advantageous in preventing breakage caused from outside to inside of the control casing 26 and the closing plate 28.

Additionally, since the insert boss portion 40A of the second bolt 38A projects toward the rear floor panel 14 so that the second bolt 38A is strongly supported by the control casing 26 and the closing plate 28 via the insert boss portion 40A, it is advantageous in preventing breakage caused from outside to inside of the control casing 26 and the closing plate 28 by the shaft portion 35 of the second bolt 38A.

Additionally, since the insert boss portion 40A extends over the entire length of the control casing 26 and the closing plate 28 in the vehicle width direction, it is advantageous in more strongly supporting the shaft portion 35 of the second bolt 38A, and it is more advantageous in preventing breakage caused from outside to inside of the control casing 26 and the closing plate 28.

As shown in FIG. 4 and FIG. 6, when the insert boss portion 36 of the first bolt 34 collides with the rear floor crossmember 12 upon vehicle collision, and then a front portion of the motor casing 23 is biased upwardly due to a load applied to the motor casing 23, the insert boss portion 40B of the second bolt 38B collides with the rear floor crossmember 12.

In this regard, the second bolt 38B is located at an outer peripheral portion of the motor unit 20, and the shaft portion 35 of the second bolt 38B extends in the direction intersecting with the direction in which the motor unit collides with the rear floor crossmember 12. Thus, a portion of the control casing 26 and a portion of the closing plate 28 located more inwardly in the motor unit 20 than the shaft portion 35 of the second bolt 38B are protected by the shaft portion 35 of the second bolt 38B. It is thus advantageous in preventing breakage caused from outside to inside of the control casing 26 and the closing plate 28. Additionally, since the shaft portion 35 of the second bolt 38B extends over the entire length of the control casing 26 and the closing plate 28 in the vehicle width direction, it is more advantageous in preventing breakage caused from outside to inside of the control casing 26 and the closing plate 28.

Additionally, since the insert boss portion 40B of the second bolt 38B projects toward the rear floor crossmember 12 so that the second bolt 38B is strongly supported by the control casing 26 and the closing plate 28 via the insert boss portion 40B, it is advantageous in preventing breakage caused from outside to inside of the control casing 26 and the closing plate 28 by the shaft portion 35 of the second bolt 38B.

Additionally, since the insert boss portion 40B extends over the entire length of the control casing 26 and the closing plate 28 in the vehicle width direction, it is advantageous in more strongly supporting the shaft portion 35 of the second bolt 38B, and it is more advantageous in preventing breakage caused from outside to inside of the control casing 26 and the closing plate 28.

Additionally, the use of the first bolt 34 and the second bolts 38A, 38B for sandwiching the control casing 26 between the closing plate 28 and the motor casing 23 enables the control casing 26 and the closing plate 28 to be protected during vehicle collision, thus advantageously reducing the number of components, size and weight of motor unit 20, compared with the case where a protector is provided at the motor unit 20.

Furthermore, since fastening of the closing plate 28 to the control casing 26 and attachment of the control casing 26 to the motor casing 23 are simultaneously performed by the first bolt 34 and the second bolts 38, it is possible to reduce the number of fastening bolts and thereby reduce man-hours.

In this context, fastening of the closing plate 28 to the control casing 26 and attachment of the control casing 26 to the motor casing 23 may be performed only by the bolts, such as the first bolt 34 and the second bolts 38, penetrating the control casing 26 and the closing plate 28; or may partially use bolts for fastening only the closing plate 28 and the control casing 26 or bolts only for attaching the control casing 26 to the motor casing 23.

It is only needed that the bolts penetrating the control casing 26 and the closing plate 28 are provided at least at portions where the motor unit 20 will collide with the vehicle component such as the rear floor crossmember 12 and the rear floor panel 14.

The insert boss portions 36, 40A, 40B may be provided at multiple sites with a spatial interval in a longitudinal direction of the shaft portions 35 of the first bolt 34 and the second bolts 38A. 38B. Advantageously, the insert boss portions 36, 40A, 40B extend over the entire length of the control casing 26 and the closing plate 28 in the vehicle width direction as in the present embodiment, in that the shaft portions 35 of the first bolt 34 and the second bolts 38A, 38B are strongly supported. In the present embodiment, the explanation was made in conjunction with the case where the vehicle structure mounted to a vehicle is the motor unit 20, but the vehicle structure may be any structure that includes the control casing 26 (first casing) for housing a high-voltage portion, the closing plate 28 (second casing) for closing the control casing 26 (first casing), and a plurality of bolts disposed at outer peripheral portions of the casings so as to fasten them. The present invention can be applied to various known vehicle structures having a high-voltage portion, such as an inverter, a converter, and a battery charger.

Moreover, in the embodiment, the explanation was made in conjunction with the case where the vehicle component with which the vehicle structure collides is the rear floor crossmember 12 and the rear floor panel 14, but the vehicle component is not limited to such members and may be a rigid member or component attached to the vehicle frame member of the rear side member 10 or the rear floor crossmember 12, of course.

The invention claimed is:
1. A vehicle, comprising:
a vehicle component constituting the vehicle, the vehicle component including a floor panel and a frame member bonded to a lower face of the floor panel and extending along the floor panel; and
a high-voltage device provided adjacent to the vehicle component,
wherein the high-voltage device is provided under a floor panel of the vehicle, and
the long bolts extend in a longitudinal direction of the frame member,
wherein the high-voltage device includes,
a casing housing a high-voltage portion; and
a plurality of bolts fastening the casing to an attachment portion to which the casing is attached,
a first end face at which the casing is in contact with the attachment portion and a second end face opposite to the first end face, the plurality of bolts being long bolts extending from the second end face to the first end face, and
insert boss portions, receiving the plurality of bolts, provided at portions of the casing into which the long bolts are inserted, and the insert boss portions protruding outward from an outer surface of the casing and extending continuously from the first end face to the second end face, and
wherein at least one of the insert boss portions projects toward the frame member and provided where a distance between the frame member and an outer surface of the casing that directly opposes the frame member is the shortest.

2. The vehicle according to claim 1,
wherein the long bolts are disposed, with a spatial interval, at a side of the casing which faces the vehicle component, and
the long bolts respectively extend in an identical direction.

3. The vehicle according to claim 2,
wherein the long bolts are disposed at an upper end on a side of the casing which faces the frame member; at a position facing a lower end of the frame member on the side of the casing which faces the frame member; and at an end portion opposite to the frame member on a side of the casing which faces the floor panel.

4. The vehicle according to claim 3,
wherein the high-voltage portion is a high-voltage control, attached to a vehicle driving motor, for controlling the vehicle driving motor.

5. The vehicle according to claim 4,
wherein the casing comprises a first casing to which the high-voltage control is attached and a second casing which covers the high-voltage control, and
the long bolts penetrate the first casing and the second casing so that the long bolts fasten the first casing to the second casing and fasten the second casing to the vehicle driving motor.

6. The vehicle according to claim 2,
wherein the high-voltage portion is a high-voltage control, attached to a vehicle driving motor, for controlling the vehicle driving motor.

7. The vehicle according to claim 6,
wherein the casing comprises a first casing to which the high-voltage control is attached and a second casing which covers the high-voltage control, and
the long bolts penetrate the first casing and the second casing so that the long bolts fasten the first casing to the second casing and fasten the second casing to the vehicle driving motor.

8. The vehicle according to claim 1,
wherein the long bolts are disposed at an upper end on a side of the casing which faces the frame member; at a position facing a lower end of the frame member on the side of the casing which faces the frame member; and at an end portion opposite to the frame member on a side of the casing which faces the floor panel.

9. The vehicle according to claim 8,
wherein the high-voltage portion is a high-voltage control, attached to a vehicle driving motor, for controlling the vehicle driving motor.

10. The vehicle according to claim 9,
wherein the casing comprises a first casing to which the high-voltage control is attached and a second casing which covers the high-voltage control, and
the long bolts penetrate the first casing and the second casing so that the long bolts fasten the first casing to the second casing and fasten the second casing to the vehicle driving motor.

11. The vehicle according to claim 1,
wherein the high-voltage portion is a high-voltage control, attached to a vehicle driving motor, for controlling the vehicle driving motor.

12. The vehicle according to claim 11,
wherein the casing comprises a first casing to which the high-voltage control is attached and a second casing which covers the high-voltage control, and
the long bolts penetrate the first casing and the second casing so that the long bolts fasten the first casing to the second casing and fasten the second casing to the vehicle driving motor.

* * * * *